(12) United States Patent
Gunnam et al.

(10) Patent No.: US 8,334,705 B1
(45) Date of Patent: Dec. 18, 2012

(54) ANALOG CIRCUITRY TO CONCEAL ACTIVITY OF LOGIC CIRCUITRY

(75) Inventors: Kiran Kumar Gunnam, San Jose, CA (US); Jay Scott Fuller, Scotts Valley, CA (US)

(73) Assignee: Certicom Corp., Mississauga (CA)

( * ) Notice: Subject to any disclaimer, the term of this patent is extended or adjusted under 35 U.S.C. 154(b) by 0 days.

(21) Appl. No.: 13/283,456

(22) Filed: Oct. 27, 2011

(51) Int. Cl.
*H03K 19/00* (2006.01)
(52) U.S. Cl. .................................................. 326/8; 326/9
(58) Field of Classification Search .................... 326/8–9
See application file for complete search history.

(56) References Cited

U.S. PATENT DOCUMENTS

| | | | |
|---|---|---|---|
| 5,991,415 A | 11/1999 | Shamir | |
| 5,995,629 A | 11/1999 | Reiner | |
| 6,041,122 A | 3/2000 | Graunke et al. | |
| 6,064,740 A | 5/2000 | Curiger et al. | |
| 6,144,740 A | 11/2000 | Laih et al. | |
| 6,278,783 B1 | 8/2001 | Kocher et al. | |
| 6,295,606 B1 | 9/2001 | Messerges et al. | |
| 6,298,135 B1 | 10/2001 | Messerges et al. | |
| 6,298,442 B1 | 10/2001 | Kocher et al. | |
| 6,304,658 B1 | 10/2001 | Kocher et al. | |
| 6,327,661 B1 | 12/2001 | Kocher et al. | |
| 6,366,673 B1 | 4/2002 | Hollmann et al. | |
| 6,381,699 B2 | 4/2002 | Kocher et al. | |
| 6,408,075 B1 | 6/2002 | Ohki et al. | |
| 6,419,159 B1 | 7/2002 | Odinak | |
| 6,420,211 B1 | 7/2002 | Brunet et al. | |
| 6,424,196 B2 | 7/2002 | Pomet | |
| 6,498,404 B1 | 12/2002 | Thueringer et al. | |
| 6,507,130 B1 | 1/2003 | Thueringer et al. | |
| 6,507,913 B1 | 1/2003 | Shamir | |
| 6,510,518 B1 | 1/2003 | Jaffe et al. | |
| 6,539,092 B1 | 3/2003 | Kocher | |
| 6,581,844 B2 | 6/2003 | Thueringer et al. | |
| 6,594,760 B1 | 7/2003 | Ryan, Jr. et al. | |
| 6,615,354 B1 | 9/2003 | Ohki et al. | |
| 6,631,471 B1 | 10/2003 | Ohki et al. | |
| 6,654,884 B2 | 11/2003 | Jaffe et al. | |
| 6,691,921 B2 | 2/2004 | Endo et al. | |
| 6,698,662 B1 | 3/2004 | Feyt et al. | |
| 6,724,894 B1 | 4/2004 | Singer | |

(Continued)

OTHER PUBLICATIONS

Extended European Search report mailed Feb. 7, 2012, in corresponding European patent application No. 11189607.2.

(Continued)

*Primary Examiner* — James H Cho
(74) *Attorney, Agent, or Firm* — Novak Druce + Quigg LLP

(57) ABSTRACT

An integrated circuit comprises logic circuitry driven by a clock and reference circuitry. In operation, logic elements of the reference circuitry are synchronized to the clock. In operation, a first sensing circuit outputs a voltage $V_C$ proportional to an instantaneous current consumption $I_C$ of the logic circuitry, and a second sensing circuit outputs a voltage $V_R$ proportional to an instantaneous fluctuating current consumption $I_R$ of the reference circuitry. In operation, differential circuitry outputs a voltage difference $\alpha V_R - V_C$ between a scaled-up version $\alpha V_R$ of the voltage $V_R$ and the voltage $V_C$, the scaled-up version scaled to approximately the scale of the voltage $V_C$. In operation, a square root circuit receives the voltage difference as input and outputs a square root of the voltage difference. A current source is controllable by the output of the square root circuit to generate current through a dissipative load.

7 Claims, 11 Drawing Sheets

U.S. PATENT DOCUMENTS

| | | | |
|---|---|---|---|
| 6,738,478 | B1 | 5/2004 | Vanstone et al. |
| 6,745,331 | B1 | 6/2004 | Silverbrook |
| 6,748,535 | B1 | 6/2004 | Ryan, Jr. et al. |
| 6,757,832 | B1 | 6/2004 | Silverbrook et al. |
| 6,766,455 | B1 | 7/2004 | Ryan, Jr. |
| 6,804,782 | B1 | 10/2004 | Qiu et al. |
| 6,820,814 | B1 | 11/2004 | Benoit |
| 6,848,619 | B1 | 2/2005 | Leydier |
| 6,873,706 | B1 | 3/2005 | Miyazaki |
| 6,876,745 | B1 | 4/2005 | Kurumatani |
| 6,883,103 | B2 | 4/2005 | Thueringer et al. |
| 6,907,526 | B2 | 6/2005 | Tanimoto et al. |
| 6,914,986 | B2 | 7/2005 | Handschuh |
| 6,965,673 | B1 | 11/2005 | Boneh et al. |
| 6,968,354 | B2 | 11/2005 | Kaminaga et al. |
| 6,973,190 | B1 | 12/2005 | Goubin |
| 6,976,178 | B1 | 12/2005 | Kissell |
| 7,000,111 | B1 | 2/2006 | Dent et al. |
| 7,017,048 | B2 | 3/2006 | Schneider et al. |
| 7,020,281 | B2 | 3/2006 | Vadekar et al. |
| 7,020,730 | B2 | 3/2006 | Kniffler |
| 7,080,001 | B2 | 7/2006 | Moriyama et al. |
| 7,117,474 | B2 * | 10/2006 | Liardet et al. ............ 326/8 |
| 7,171,437 | B2 | 1/2007 | Yamaguchi |
| 7,188,282 | B2 | 3/2007 | Walmsley |
| 7,193,482 | B2 | 3/2007 | Silverbrook |
| 7,372,290 | B2 * | 5/2008 | Fruhauf et al. ............ 326/8 |
| 7,716,502 | B2 | 5/2010 | Muresan et al. |
| 7,847,581 | B2 * | 12/2010 | Lisart et al. ............ 326/8 |
| 2007/0076890 | A1 | 4/2007 | Muresan et al. |

OTHER PUBLICATIONS

Vahedi h. et al; Power-smart system-on-chip architecture for embedded cryptosystems, Codes +ISSS 2005. international conference on hardware/software codesign & system synthesis. Jersey City, NJ, Sep. 18-21, 2005; International conference on hardware/software codesign and system synthesis, New York, NY: ACM, US, Sep. 1, 2005, pp. 184-189, XP031013176, ISBN: 978-1-59593-1611-0.

Vahedi H. et al. Low-voltage wide-range built-in current sensing for system-on-chip applications, Circuits and systems, 2005. 48th midwest symposium on Cinicinnati, Ohio Aug. 7-10, 2005, Piscataway, US, Aug. 7, 2005, pp. 843-846, XP010893721. DOI: 10.1109/MWSCAS.2005.1594233 ISBN: 978-0-7803-9197-0.

"Federal Information Processing Standards Publication 197: Announcing the Advanced Encryption Standard (AES)", Nov. 26, 2001.

Daemen, Joan et al., "Rijndael", NISSC 2000 Oct. 23, 2000.

Li, Lisha et al., "CMOS Current Mode Logic Gates for High-Speed Applications", 12th NASA Symposium on VLSI Design, Coeur d'Alene, Idaho, USA, Oct. 4-5, 2005.

Mechkov, Cyril, "Equalizing the Currents in Wilson Current Mirror", International Scientific Conference Computer Science 2008, pp. 248-252.

Pan, J. et al., "You Cannot Hide behond the Mask: Power Analysis on a Provably Secure S-Box Implementation", H. Y. Youm and M. Yung (Eds.): WISA 2009, LNCS 5932, pp. 178-192, 2009.

Tiri, Kris, "Side-Channel Attack Pitfalls", DAC 2007, Jun. 4-8, 2007, San Diego, California, USA.

Daemen, Joan et al. "The Rijndael Block Cipher AES Proposal", 1999.

Partial Search Report for EP 11189605.6, Jul. 13, 2012.

Gandolfi, Karine et al. "Electromagnetic Analysis: Concrete Results" In: "Field Programmable Logic and Application", Springer-Verlag Berlin Heidelberg, XP55031930, Jan. 1, 2001.

Quisquater, Jean-Jacques et al. "Electromagnetic Analysis (EMA): Measures and Counter-Measures for Smart Cards" In: "Smart Card Programming and Security", Springer-Verlag Berlin Heidelberg, XP55031642, Jan. 1, 2001.

* cited by examiner

US 8,334,705 B1

ANALOG CIRCUITRY TO CONCEAL ACTIVITY OF LOGIC CIRCUITRY

BACKGROUND

Variations in the power consumption of logic circuitry or a portion thereof may reveal details of the one or more operations performed by the logic circuitry and may reveal the data on which the one or more operations are being performed. In an example where the logic circuitry performs one or more cryptographic operations, variations in the power consumption of logic circuitry or a portion thereof may reveal any one or any combination of: cryptographic keys, random or pseudorandom numbers, details of algorithms, and data on which the one or more cryptographic operations are being performed. An attack that makes use of varying power consumption by the logic circuitry during computation is known as a power monitoring attack, which is a type of side-channel attack.

Electromagnetic (EM) probe attacks are another type of side-channel attacks. An EM probe placed over a portion of the logic circuitry will detect EM emission from that portion.

BRIEF DESCRIPTION OF THE DRAWINGS

The technology described herein is illustrated by way of example and not limitation in the figures of the accompanying drawings, in which like reference numerals indicate corresponding, analogous or similar elements, and in which:

FIG. 2-1 is a block diagram illustration of an example integrated circuit;

FIG. 2-2 is a block diagram illustration of an example module in the integrated circuit of FIG. 2-1;

It will be appreciated that for simplicity and clarity of illustration, elements shown in the figures have not necessarily been drawn to scale. For example, the dimensions of some of the elements may be exaggerated relative to other elements for clarity.

DETAILED DESCRIPTION

In the following detailed description, numerous specific details are set forth in order to provide a thorough understanding of technology. However it will be understood by those of ordinary skill in the art that the technology may be practiced without these specific details. In other instances, well-known methods, procedures, components and circuits have not been described in detail so as not to obscure the description.

An integrated circuit comprises logic circuitry for performing one or more operations. The logic circuitry is organized in a multi-level hierarchy of modules such that a module at a higher level comprises multiple modules at an immediately lower level in the hierarchy. The integrated circuit further comprises multiple sensing circuits. In operation, each sensing circuit senses an instantaneous current consumption $I_C$ of a respective one of the modules that draws current entirely through the sensing circuit. The integrated circuit further comprises a concealing circuit for each of the sensing circuits. In operation, the concealing circuit receives as input a voltage $V_C$ corresponding to the sensed instantaneous current consumption of its respective module. In operation, the concealing circuit dissipates an instantaneous power $P_L$ such that an instantaneous power sum $P_{TOTAL}$ of the instantaneous power $P_L$ and the instantaneous power $P_C$ dissipated by its respective module is substantially independent of the activity of its respective module.

Figure 1:
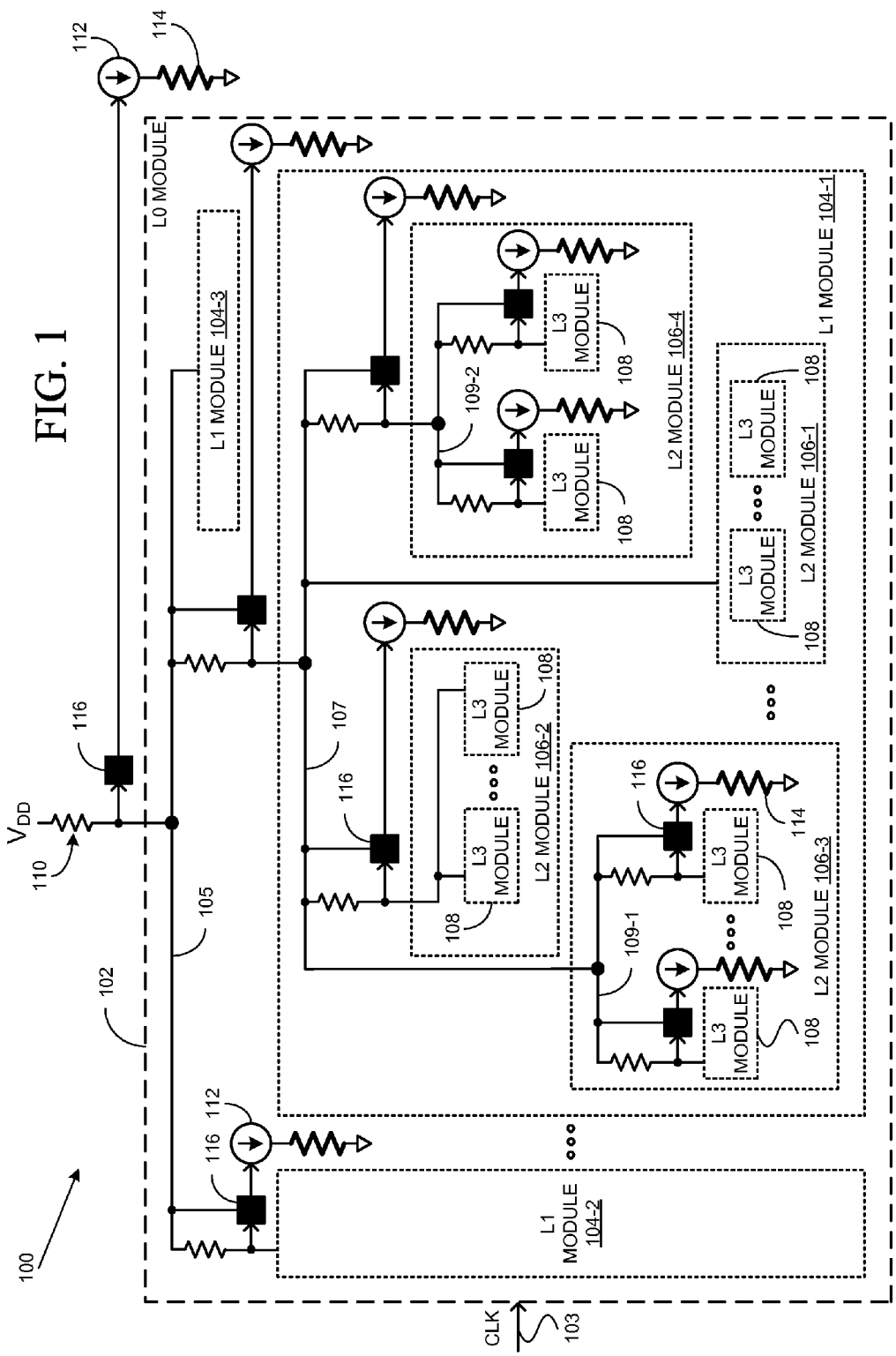
FIG. 1 is a block diagram illustration of an example integrated circuit.

FIG. 1 is a block diagram illustration of an example integrated circuit (IC), generally referenced 100. Integrated circuit 100 comprises a semiconductor die (not shown) and, if the integrated circuit is a packaged die, packaging (not shown) for the semiconductor die. Integrated circuit 100 comprises example logic circuitry 102 for performing one or more operations. Logic circuitry 102 draws current from one or more power lines, illustrated for simplicity as a single voltage source $V_{DD}$. Logic circuitry 102 is driven by one or more clock signals, illustrated for simplicity as a single clock 103.

Logic circuitry 102 is organized in a multi-level hierarchy of modules. Logic circuitry 102 in its entirety may be considered a module of the highest level L0. Each higher-level module comprises multiple modules of an immediately lower level in the hierarchy. For simplicity, a 4-level hierarchy (L0, L1, L2, L3) is illustrated, however the technology described herein is also appropriate for 2-level hierarchies (L0, L1), 3-level hierarchies (L0, L1, L2) and hierarchies of more than 4 levels.

In the illustrated example, logic circuitry 102 comprises multiple modules of an immediately lower level L1 in the hierarchy, explicitly showing three L1 modules referenced 104-1, 104-2 and 104-3, respectively. The composition and functionality of any two L1 modules may be identical or may differ from each other. All L1 modules receive their power from a power distribution network 105 in the L0 module.

In the illustrated example, L1 module 104-1 comprises multiple modules of an immediately lower level L2 in the hierarchy, explicitly showing four L2 modules referenced 106-1, 106-2, 106-3 and 106-4, respectively. The composition and functionality of any two L2 modules may be identical or may differ from each other. All L2 modules in L1 module 104-1 receive their power from a power distribution network 107 in L1 module 104-1.

In the illustrated example, each of L2 modules 106-1, 106-2, 106-3 and 106-4 comprises multiple modules 108 of a lowest level L3 in the hierarchy, explicitly showing two L3 modules. Despite being referenced by the same numeral 108, the composition and functionality of any two L3 modules may be identical or may differ from each other. All L3 modules in L2 module 106-3 receive their power from a power distribution network 109-1 in L2 module 106-3. All L3 modules in L2 module 106-4 receive their power from a power distribution network 109-2 in L2 module 106-4.

Logic circuitry 102 and its modules, depending on their current state and the data on which logic circuitry 102 is performing its one or more operations, may draw current at active edges of clock 103. Variations in the current consumption of a single lower-level module or of logic circuitry 102 in its entirety may reveal details of the one or more operations performed by logic circuitry 102 and may reveal the data on which the one or more operations are being performed. In the example where logic circuitry 102 performs one or more cryptographic operations, variations in the current consumption of a single lower-level module or of logic circuitry 102 in its entirety may reveal any one or any combination of: cryptographic keys, random or pseudorandom numbers, details of algorithms, and data on which the one or more cryptographic operations are being performed. An attack that makes use of varying current consumption by the logic circuitry during computation is known as a power monitoring attack, which is a type of side-channel attack.

Integrated circuit 100 comprises multiple sensing circuits, illustrated for simplicity as resistive elements. Each sensing circuit is to sense current consumption of a respective one of the modules. For each of the sensing circuits, the integrated circuit comprises a dedicated concealing circuit that receives as input a voltage corresponding to the current consumption sensed by the sensing circuit. A concealing circuit conceals the current consumption of the module to which the concealing circuit is dedicated.

Figure 5:
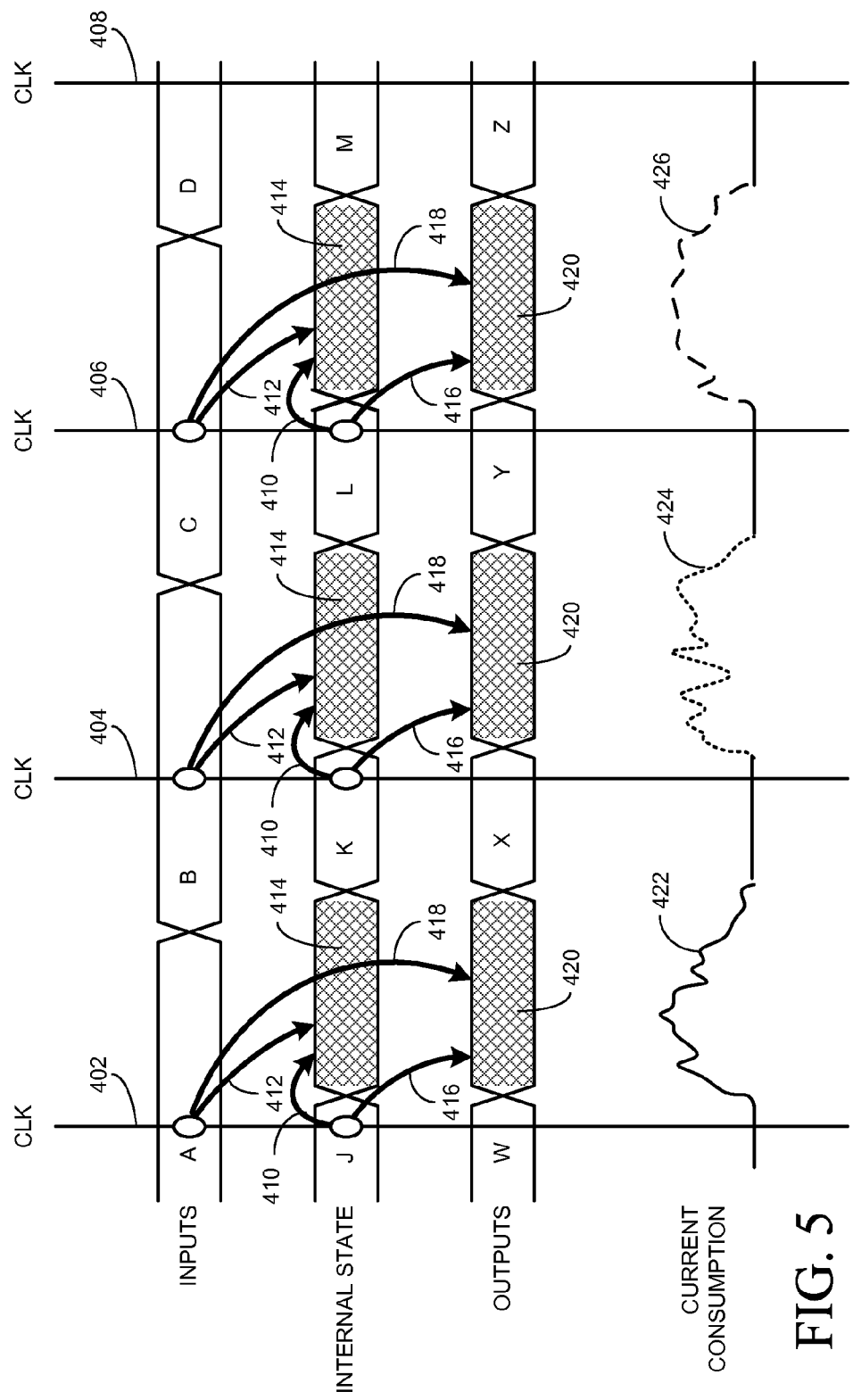
FIG. 5 is a timing diagram, helpful in understanding the operation of a module of logic circuitry.

As will become apparent from the description of FIG. 5, the sensed current consumption changes at frequencies higher than the frequency of clock 103. For example, in static complementary metal-oxide semiconductor (CMOS) integrated circuits, assuming a clock at a frequency of 250 MHz, the clock period is 4 nanoseconds. Most of the power dissipation of the module happens in the form of dynamic power dissipation and crowbar power dissipation following the active edges of the clock, which occurs over approximately 20%-30% of the clock period. At the rest of the clock period, most of the power dissipation is leakage which is smaller compared to the power dissipation following the active edges of the clock.

In the illustrated example, each concealing circuit comprises a controllable current source 112, a dissipative load 114 to draw current from controllable current source 112, and a control circuit 116 to control controllable current source 112 to produce current according to current consumption sensed by the sensing circuit. The dissipative loads 114 are illustrated as resistive elements, the controllable current sources 112 are illustrated as circles with downward pointing arrows, and the control circuits 116 are illustrated as black boxes. Each controllable current source 112 receives power from one or more power lines, for example, from single voltage source $V_{DD}$, although this is not illustrated explicitly in FIG. 1. A non-exhaustive list of examples for controllable current source 112 includes a voltage-to-current converter, an operational transconductance amplifier, and a voltage controlled current source.

Implementation of the technology described herein imposes a power distribution constraint that a lower-level module for which the integrated circuit comprises dedicated concealing circuit receives its power entirely through a sensing circuit from the power distribution network of the immediately higher-level module to which the lower-level module belongs. In the absence of this power distribution constraint, the sensing circuit would be unable to sense all of the current consumption of the lower-level module.

In the illustrated example, the integrated circuit comprises dedicated concealing circuits for some of the lower-level modules, namely L1 modules 104-1 and 104-2, L2 modules 106-2 and 106-4, and the L3 modules belonging to L2 modules 106-3 and 106-4, and therefore those lower-level modules receive their power entirely through a sensing circuit from the power distribution network of the immediately higher-level module to which they belong.

In the illustrated example, the integrated circuit does not comprise dedicated concealing circuits for others of the lower-level modules, namely L1 module 104-3, L2 modules 106-1 and 106-3, and the L3 modules belonging to L2 modules 106-1 and 106-2. Therefore, as illustrated for L1 module 104-3, L2 modules 106-1 and 106-3, and the L3 modules belonging to L2 module 106-2, those lower-level modules receive their power directly from the power distribution network of the immediately higher-level module to which they belong. Because the integrated circuit does not comprise a dedicated concealing circuit for L2 module 106-1, the L3 modules belonging to L2 module 106-1 receive their power directly from power distribution network 107 of L1 module 104-1.

A concealing circuit conceals the current consumption $I_C$ of the module to which the concealing circuit is dedicated by consuming current such that an instantaneous power sum $P_{TOTAL}$ of an instantaneous power $P_L$ dissipated by the concealing circuit and the instantaneous power $P_C$ dissipated by the module is substantially independent of activity of the module. The contribution to the instantaneous power sum $P_{TOTAL}$ that arises from data-specific switching in the module may be lower than the power level of the noise which is always present in the integrated circuit. This noise could be due to a variety of factors such as substrate coupling and the noise of MOS transistors. Inclusion of the concealing circuit in the integrated circuit may reduce the susceptibility of the module to which the concealing circuit is dedicated to power analysis attacks and may reduce the susceptibility of the logic circuit in its entirety to power analysis attacks.

The concealing circuit may be co-located, that is, placed and routed together, with the module to which the concealing circuit is dedicated. For example, the module may have 100 logic gates and the concealing circuit may have 50 logic gates, and all these gates are interspersed, placed and routed together. Such co-location may thwart electromagnetic (EM) probe attacks, which are another type of side-channel attacks, because the proximity of the module to its dedicated concealing circuit means that an EM probe placed over the module will detect not only the EM emission from the module but also the EM emission from the concealing circuit. The detected EM emission is substantially independent of activity of the module, and therefore the detected EM emission will not reveal operational details of the module.

The current consumption of higher-level modules is greater than the current consumption of lower-level modules, thus a concealing circuit will be designed for the current consumption of the module to which the concealing circuit is dedicated, in that the concealing circuit is designed based on the peak current and the rate of change of current of the module. For example, transistor sizing and load capacitance in the concealing circuit may be designed based on the peak current and the rate of change of current of the module.

Because the current consumption of a single lower-level module is less than the current consumption of the logic circuitry in its entirety, a concealing circuit dedicated to the single lower-level module may be able to respond more quickly to variations in the current consumption of the single lower-level module than a concealing circuit dedicated to the logic circuitry in its entirety.

If lower-level modules belonging to a higher-level module have dedicated concealing circuits, the variations in current consumption to be concealed by a concealing circuit dedicated to the higher-level module will be smaller than if those lower-level modules did not have dedicated concealing circuits. Consequently, the rate of change of variations in the current consumption will be slower in the concealing circuit dedicated to the higher-level module than what would have been the rate of change if those lower-level modules did not have dedicated concealing circuits.

The inclusion of sensing circuits and dedicated concealing circuits in an integrated circuit that comprises logic circuitry increases the die size and may also increase the overall cost of the integrated circuit. In some implementations, the integrated circuit may be designed to include a sensing circuit and a dedicated concealing circuit for each and every module in the multi-level hierarchy of modules of the logic circuitry. In other implementations, the integrated circuit may be designed so that it comprises sensing circuits and dedicated concealing circuits for some of the modules and does not comprise sensing circuits and dedicated concealing circuits for others of the modules. Integrated circuit 100 is an example of an integrated circuit that does not comprise sensing circuits and dedicated concealing circuits for each and every module in the logic circuitry.

The inclusion in an integrated circuit of a dedicated concealing circuit for a module may provide some protection from side-channel attacks on the module. The benefit of including in an integrated circuit a dedicated concealing circuit for a particular module may be minimal where the particular module already has, through a different technique, some protection from side-channel attacks, especially if the particular module comprises lower-level modules for which the integrated circuit does include dedicated concealing circuits. Therefore, to avoid undue increases in the die size, the integrated circuit may be designed not to comprise sensing circuits and dedicated concealing circuits for modules that already have, through a different technique, some protection from side-channel attacks, especially where those modules comprise lower-level modules for which the integrated circuit does include dedicated concealing circuit.

For example, complementary logic is a technique that provides some protection from side-channel attacks. The integrated circuit may comprise complementary logic for some of the modules. The integrated circuit may be designed not to comprise concealing circuits for such modules, especially where such modules comprise lower-level modules for which the integrated circuit does include a dedicated concealing circuit.

In another example, dual data paths—with or without complementary logic—is a technique that provides some protection from side-channel attacks. The integrated circuit may comprise dual data paths for some of the modules. The integrated circuit may be designed not to comprise concealing circuits for such modules, especially where such modules comprise lower-level modules for which the integrated circuit does include a dedicated concealing circuit.

In yet another example, constant current circuits is a technique that provides some protection from side-channel attacks. The integrated circuit may comprise constant current circuits, such as wave dynamic differential logic (WDDL), for some of the modules. The integrated circuit may be designed not to comprise concealing circuits for such modules, especially where such modules comprise lower-level modules for which the integrated circuit does include a dedicated concealing circuit.

In a further example, masking is a technique that provides some protection from side-channel attacks. Some of the modules of the integrated circuit may operate on masked data, that is, on data to which a mask has been applied. The integrated circuit may be designed not to comprise concealing circuits for such modules, especially where such modules comprise lower-level modules for which the integrated circuit does include a dedicated concealing circuit.

More generally, an integrated circuit that includes modules that operate on masked data also includes one or more modules for storing a mask, for modifying the mask, for applying the mask to data, for removing the mask, and the like. The integrated circuit may be designed to implement a hiding technique on the modules that store, modify, apply, or remove the mask, and may be designed not to implement the hiding technique to the modules that operate on masked data. A reason for this is that the module that operates on masked data inherently has some protection by virtue of the mask. The hiding technique is, for example, the use of sensing circuits and concealing circuits as described in this document, or the use of complementary logic, or the use of dual data paths—with or without complementary logic, or the use of constant current circuits.

FIG. 1 does not illustrate data interconnections between the multiple modules comprised in logic circuitry 102. Rather, as already discussed in detail above, FIG. 1 illustrates how power is distributed within logic circuitry 102, how power is distributed to the control circuits 116, and how current consumption of modules is sensed and used to control the generation of current by controllable current sources 112, which current is dissipated by dissipative loads 114.

There are different options for organizing logic circuitry 102 in the multi-level hierarchy of modules. In one option, the hierarchy may be based on an increasing number of logic gates per module at each higher level, for example, inverters, XOR, NOR, NAND and other logic gates. For example, the increasing number of logic gates per module may follow a logarithmic scale, such as 100,000 logic gates per module at the highest level L1, 10,000 logic gates per module at the next level L2, 1000 logic gates per module at the next level L3, and 100 logic gates at the lowest level L4. In another example, the increasing number of logic gates per module may follow a non-linear pattern, such as 100 logic gates per module at the lowest level, 200 logic gates per module at the next level, 400 logic gates per module at the next level, 800 logic gates per module at the next level, 1600 logic gates per module at the next level, 3200 logic gates per module at the next level, 6400 logic gates per module at the next level, and so on.

In another option, the hierarchy may be based on an increasing average current consumption per module at each higher level. For example, the increasing average current consumption per module may follow a logarithmic scale, such as 1 Amperes (A) at the highest level L1, 100 mA at the next level L2, 10 mA at the next level L3, 1 mA at the next level L4, 100 µA at the next level L5, and 10 µA at the lowest level L6.

In a further option, the hierarchy may be based on a functional hierarchy or natural design hierarchy of logic circuitry 102. For example, where logic circuitry 102 implements one or more Advanced Encryption Standard (AES) operations, a 4-level hierarchy may be appropriate, in which the lowest level L3 comprises XOR array modules and shifter array modules, the next level L2 comprises AddRoundKey modules, S-box modules, MixColumns modules, and ShiftRows modules, and the next level L1 comprises one or more of a group consisting of an AES encryption core module, an AES decryption core module, and an AES decryption core module. This example is described with respect to FIG. 2-1 and FIG. 2-2.

Figures 1, 2:
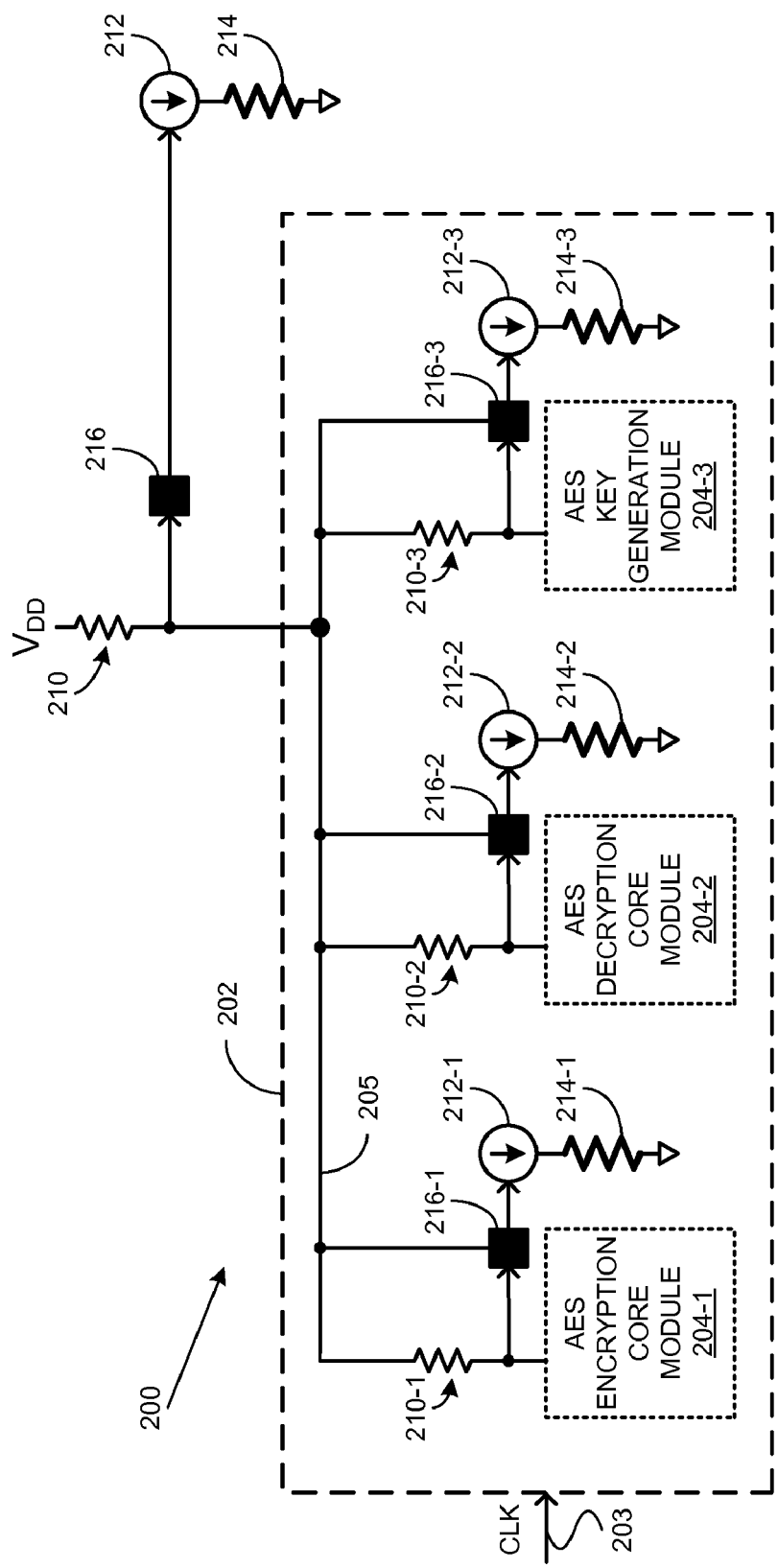
Figure 2:
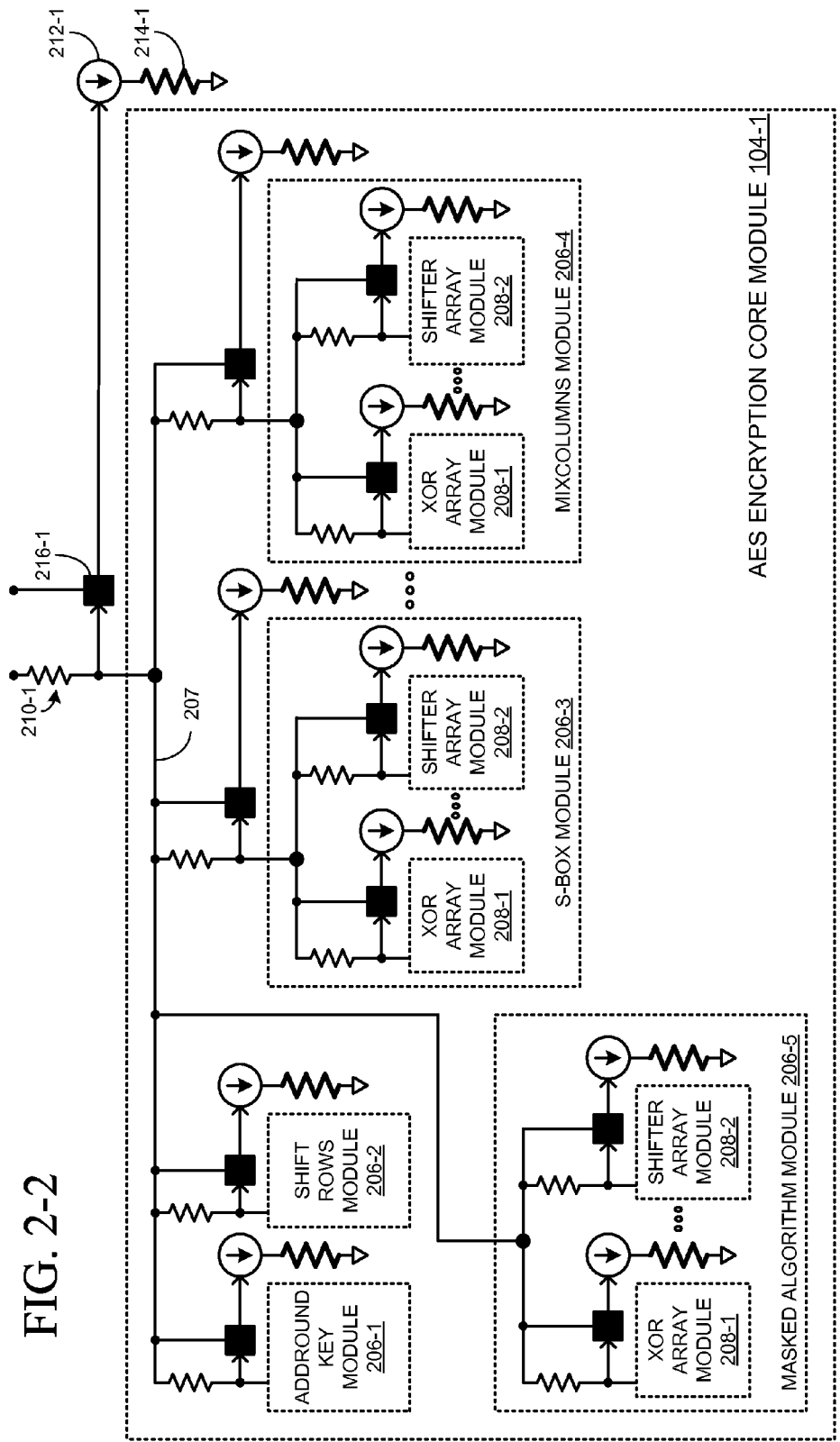

FIG. 2-1 is a block diagram illustration of an example integrated circuit, generally referenced 200. Integrated circuit 200 is an example of integrated circuit 100 described above.

Integrated circuit 200 comprises example logic circuitry 202 for performing one or more cryptographic operations. In the illustrated example, the cryptographic operations are based on the Advanced Encryption Standard (AES), which was announced on Nov. 26, 2001 by the National Institute of Standards and Technology (NIST). Logic circuitry 202 draws current from one or more power lines, illustrated for simplicity as a single voltage source $V_{DD}$. Logic circuitry 202 is driven by one or more clock signals, illustrated for simplicity as a single clock 203.

Logic circuitry 202 is organized in a multi-level hierarchy of modules, based on functionality of the modules. Logic circuitry 102 in its entirety may be considered a module of the highest level L0. In the illustrated example, logic circuitry 202 comprises an AES Encryption Core module 204-1, an AES Decryption Core module 204-2 and an AES Key Generation module 204-3, all receiving their power from a power distribution network 205 in the L0 module.

Integrated circuit 200 comprises multiple sensing circuits, illustrated for simplicity as resistive elements. Each sensing circuit is to sense current consumption of a respective one of the modules. As noted above, the sensed current consumption changes at frequencies higher than the frequency of clock 103.

For example, logic circuitry 202 draws current entirely through a sensing circuit 210 into its power distribution network 205. AES Encryption Core module 204-1 draws current from power distribution network 205 entirely through a sensing circuit 210-1. AES Decryption Core module 204-2 draws current from power distribution network 205 entirely through a sensing circuit 210-2. AES Key Generation Core module 204-3 draws current from power distribution network 205 entirely through a sensing circuit 210-3.

For each of the sensing circuits, integrated circuit 200 comprises a dedicated concealing circuit that receives as input a voltage corresponding to the current consumption sensed by the sensing circuit. For example, integrated circuit 200 comprises a dedicated concealing circuit for logic circuitry 202 in its entirety, the concealing circuit comprising a controllable current source 212, a dissipative load 214 to draw current from controllable current source 212, and a control circuit 216 to control controllable current source 212 to produce current according to current consumption sensed by sensing circuit 210.

Integrated circuit 200 comprises a dedicated concealing circuit for AES Encryption Core module 204-1, the concealing circuit comprising a controllable current source 212-1, a dissipative load 214-1 to draw current from controllable current source 212-1, and a control circuit 216-1 to control controllable current source 212-1 to produce current according to current consumption sensed by sensing circuit 210-1.

Integrated circuit 200 comprises a dedicated concealing circuit for AES Decryption Core module 204-2, the concealing circuit comprising a controllable current source 212-2, a dissipative load 214-2 to draw current from controllable current source 212-2, and a control circuit 216-2 to control controllable current source 212-2 to produce current according to current consumption sensed by sensing circuit 210-2.

Integrated circuit 200 comprises a dedicated concealing circuit for AES Key Generation Core module 204-3, the concealing circuit comprising a controllable current source 212-3, a dissipative load 214-3 to draw current from controllable current source 212-3, and a control circuit 216-3 to control controllable current source 212-3 to produce current according to current consumption sensed by sensing circuit 210-3.

The dissipative loads 214, 214-1, 214-2 and 214-3 are illustrated as resistive elements, the controllable current sources 212, 212-1, 212-2 and 212-3 are illustrated as circles with downward pointing arrows, and the control circuits 216, 216-1, 212-2 and 216-3 are illustrated as black boxes. Each controllable current source receives power from one or more power lines, for example, from single voltage source $V_{DD}$, although this is not illustrated explicitly in FIG. 2-1. In some implementations, controllable current sources 212-1, 212-2 and 212-3 receive power from power distribution network 205. A non-exhaustive list of examples for controllable current sources 212, 212-1, 212-2 and 212-3 includes voltage-to-current converters, operational transconductance amplifiers, and voltage controlled current sources.

FIG. 2-2 is a block diagram illustration of AES Encryption Core module 104-1. Details of AES Encryption Core module 104-1 discussed below are equally applicable to AES Decryption Core module 104-2 and to AES Key Generation module 104-3.

In the illustrated example, AES Encryption Core module 104-1 comprises an AddRoundKey module 206-1, a ShiftRows module 206-2, an S-box module 206-3, a MixColumns module 206-4, each of which receives power from a power distribution network 207 through a respective sensing circuit, and for each of which integrated circuit 200 comprises a dedicated concealing circuit.

AES Encryption Core module 104-1 also comprises a masked algorithm module 206-5 for which integrated circuit 200 does not comprise a dedicated concealing circuit. Therefore masked algorithm module 206-5 receives power directly from power distribution network 207. Masked algorithm module 206-5 operates on masked data, that is, on data to which a mask has been applied. The output of masked algorithm module 206-5 may be subject to additional masked algorithm modules or may be demasked, that is, have the mask removed.

In the illustrated example, S-box module 206-3, MixColumns module 206-4 and masked algorithm module 206-5 comprise a combination of XOR array modules 208-1 and Shifter array modules 208-2, for each of which the integrated circuit comprises a sensing circuit and a dedicated concealing circuit. Hence each of the XOR array modules 208-1 and the Shifter Array modules 208-2 receives its power through its sensing circuit from the power distribution network of its immediately-higher level module. Although not explicitly illustrated in FIG. 2-2, AddRoundKey module 206-1 and ShiftRows module 206-2 also comprise a combination of XOR array modules 208-1 and Shifter Array modules 208-2, for each of which the integrated circuit comprises a sensing circuit and a dedicated concealing circuit.

Figure 3:
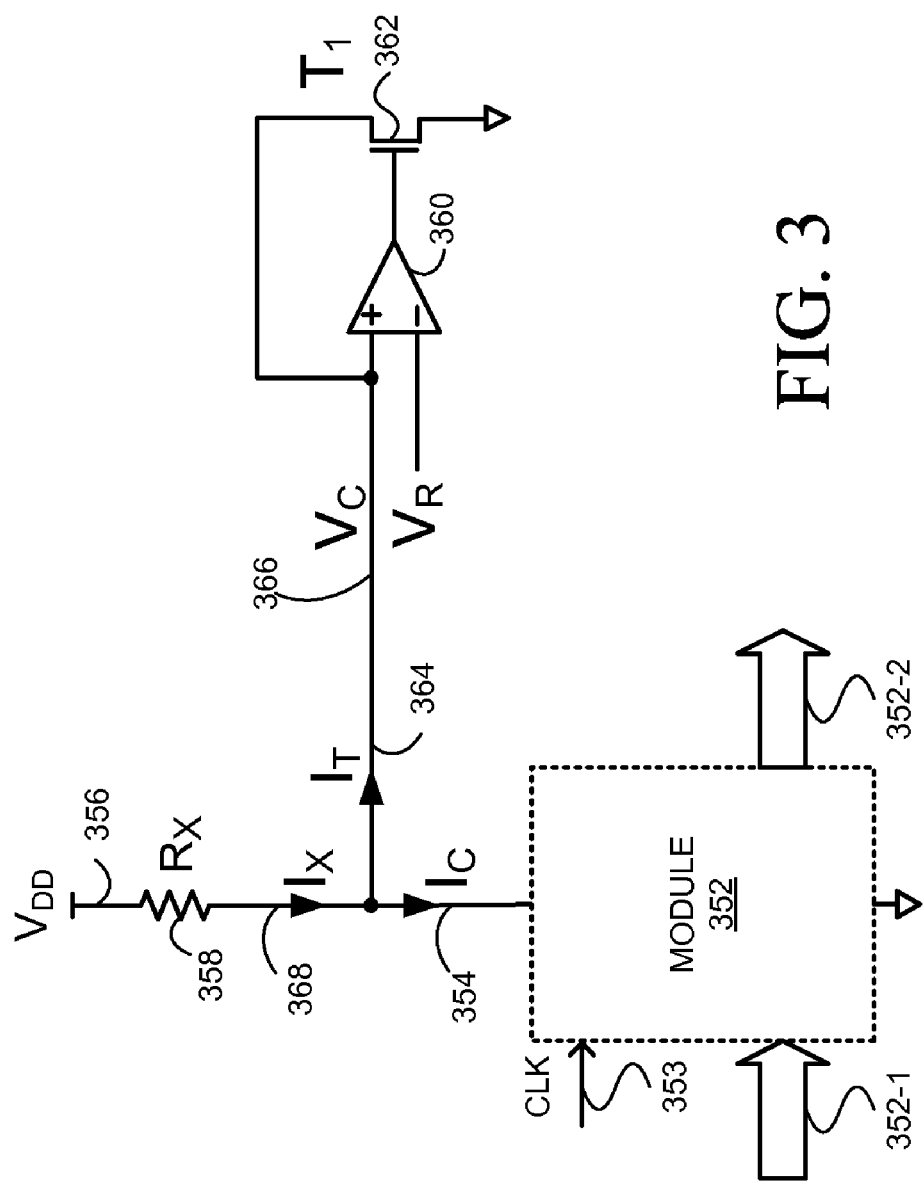
FIG. 3 is a simplified circuit diagram illustration of a portion of an example integrated circuit, providing additional detail as to the composition of an example concealing circuit.

FIG. 3 is a simplified circuit diagram illustration of a portion of an example integrated circuit, providing additional detail as to the composition of an example concealing circuit.

Logic circuitry, for example, logic circuitry 102 or logic circuitry 202, comprises a module 352. One or more data inputs to module 352 are indicated by an arrow 352-1 and one or more data outputs from module 352 are indicated by an arrow 352-2. Module 352 is driven by a clock 353. Module 352, which comprises one or more logic elements such as gates, flip-flops, state machines, and the like, draws a fluctuating current 354 from a power distribution network 356 via a resistor 358. Resistor 358 is further referenced $R_X$, fluctuating current 354 is further referenced $I_C$, and power distribution network 356 is further referenced $V_{DD}$. The internal state of module 352 at any time is the combination of the states of all its logic elements.

An operational amplifier (OP_AMP) 360 receives a constant reference voltage $V_R$ to its inverting input. A transistor 362, for example a field-effect transistor (FET) transistor, is connected to an output of OP-AMP 360 and to a non-inverting input of OP-AMP 360. Transistor 362 is further referenced $T_1$. In the example of a FET transistor, a gate of transistor 362 is connected to an output of OP-AMP 360 and a drain of the FET transistor is connected to the non-inverting input of OP-AMP 360.

Transistor 362 and the non-inverting input of OP-AMP 360 are connected to draw a fluctuating current 364 from $V_{DD}$ via resistor $R_X$. Fluctuating current 364 is further referenced $I_T$. A corresponding fluctuating voltage 366 at the non-inverting input of OP-AMP 360 is further referenced $V_C$. In a non-limiting example, $V_R$ may have a value of $V_{C\_MAX}$, where $V_{C\_MAX}$ is a maximal value of $V_C$. OP-AMP 360 controls the conductivity of transistor $T_1$ according to a voltage difference between $V_C$ and $V_R$ and therefore influences the magnitude of the current $I_T$ according to the voltage difference between $V_C$ and $V_R$.

A fluctuating current 368, further referenced $I_X$, flows through $R_X$, and is the sum of current $I_C$ and current $I_T$. The circuit of FIG. 3 attempts to regulate the sum of powers dissipated by $R_X$, $T_1$ and module 352 to be substantially constant. If the power consumption of module 352 decreases, $I_C$ decreases and OP-AMP 360 controls transistor $T_1$ to increase current $I_T$. The increase in current $I_T$ causes an increase in the power consumption of $T_1$ and causes an increase in current $I_X$, which in turn causes an increase in the power consumption of $R_X$. Therefore, the circuit of FIG. 3 attempts to balance a decrease in the power consumption of module 352 by increasing the power consumption of transistor $T_1$ and resistor $R_X$, and vice versa. Overall, the power consumption of the elements shown in FIG. 3 is substantially constant and therefore independent of the activity of module 352.

Figure 4:
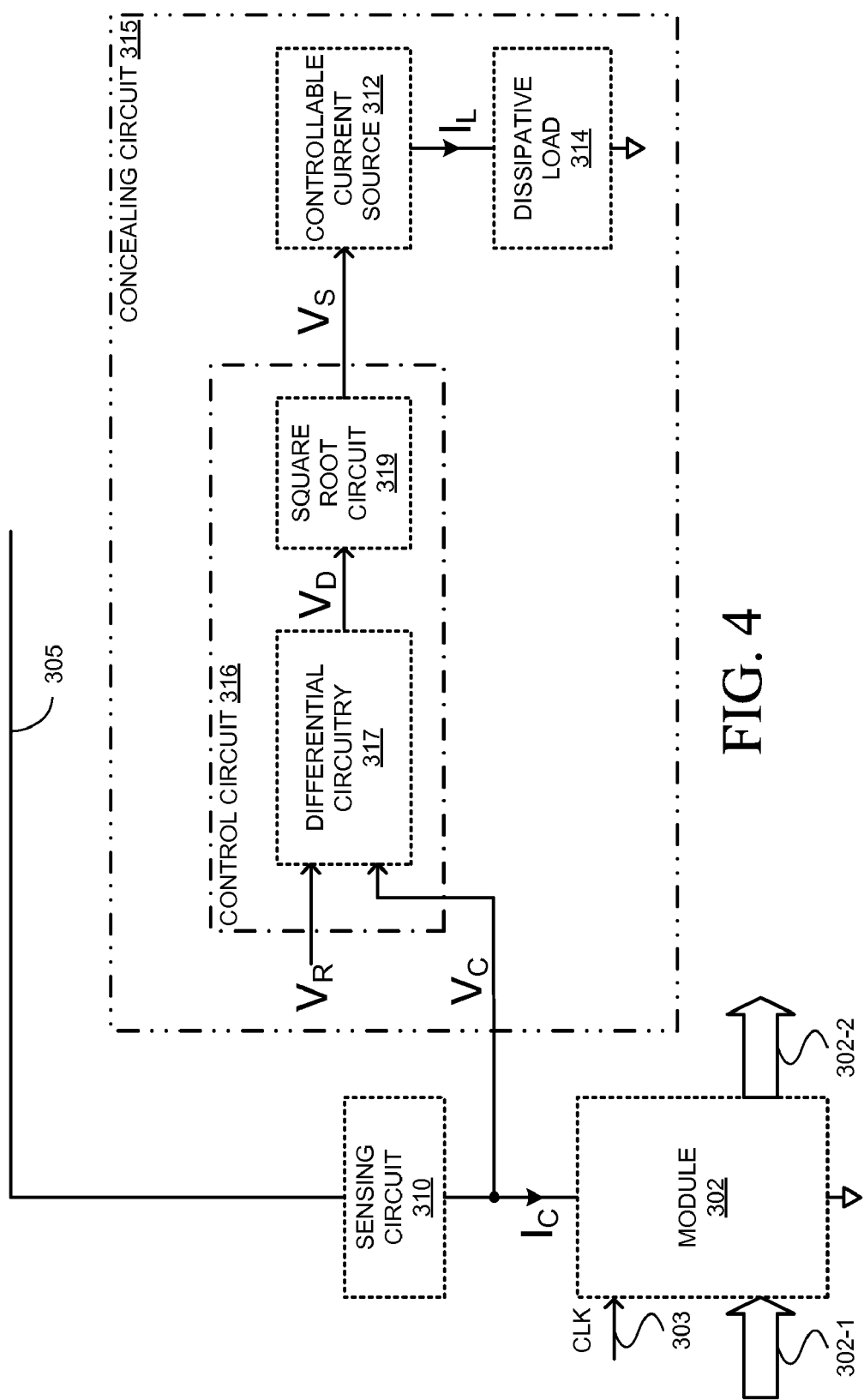
FIG. 4 is a block diagram illustration of a portion of an example integrated circuit, providing additional detail as to the composition of an example concealing circuit.

FIG. 4 is a block diagram illustration of a portion of an example integrated circuit, providing additional detail as to the composition of an example concealing circuit, and specifically to the composition of an example control circuit.

Logic circuitry, for example, logic circuitry 102 or logic circuitry 202, comprises a module 302. One or more data inputs to module 302 are indicated by an arrow 302-1 and one or more data outputs from module 302 are indicated by an arrow 302-2. Module 302 is driven by a clock 303. Module 302, which comprises one or more logic elements such as gates, flip-flops, state machines, and the like, draws current from a power distribution network 305. The internal state of module 302 at any time is the combination of the states of all its logic elements.

Briefly, FIG. 5 is a timing diagram helpful in understanding the operation of module 302. Active edges of clock 303 are illustrated in FIG. 5 as vertical lines. The active edges may be the rising edges of clock 303, or the falling edges of clock 303, or both the rising edges of clock 303 and the falling edges of claim 303.

The values of the one or more data inputs may change in advance of each active edge of clock 303. For example, in advance of active edges 402, 404, 406 and 408, the values of the data inputs are collectively indicated as "A", "B", "C" and "D", respectively.

At each active edge, module 302 samples its data inputs. A short time thereafter, the elements of module 302 react to the sampled inputs, eventually settling into a new internal state in advance of the next active edge. The new internal state depends both on the previous internal state, as indicated by arrows 410, and on the sampled inputs, as indicated by arrows 412. Some elements of module 302 may react faster than other elements of module 302. While the elements are reacting, the internal state of module 302 is unsettled, as illustrated in FIG. 5 by hatched areas 414. For example, the internal state of module 302 transitions from "J" to "K" to "L" to "M" following active edges 402, 404 and 406 respectively.

The timing diagram is not drawn to scale. It will be appreciated by persons of ordinary skill in the art that the period of time during which the elements of module 302 react to sampled inputs and settle into a new internal state in advance of the next active edge may depend on many factors, for example, the timing design of module 302, the composition of the die, the operating temperature, and in which technology the logic gates are implemented (e.g., CMOS, TTL, and the like).

Just as the elements of module 302 react to the sampled inputs and settle into a new internal state in advance of the next active edge, the one or more data outputs settle into new values in advance of the next active edge. The new values of the one or more data outputs depend both on the previous internal state, as indicated by arrows 416, and on the sampled inputs, as indicated by arrows 418. Because the data outputs are merely samples of selected ones of the elements of module 302, while the internal state of module 302 is unsettled, the data outputs may also be unsettled, as illustrated in FIG. 5 by hatched areas 420. For example, the data outputs transition from values collectively indicated as "W" to "X" to "Y" to "Z" following active edges 402, 404 and 406, respectively.

The elements of module 302 consume current as they switch their internal logical states in reaction to the sampled inputs. Example current consumption traces are illustrated, with a flat line indicating the constant current consumption of module 302 while in a settled internal state, in idealized, that is, noiseless, circumstances. Traces 422, 424 and 426 represent the output of sensing circuit 310, which is the voltage corresponding to the current consumption of module 302 following active edges 402, 404 and 406, respectively. Part of the current consumption of module 302 following active edges 402, 404 and 406 is due to general switching that will occur regardless of the previous internal state and the sampled data inputs, and part is due to data-specific switching that occurs due to the previous internal state and the sampled data inputs. Traces 422, 424 and 426 differ from one another because the changes in the internal state of module 302 are different after each active edge, due to differences in the previous internal state and in the sampled data inputs. It is those differences in traces 422, 424 and 426 which may yield information about the inner workings of module 302 or information about the sampled data inputs or both, in a power analysis attack.

Returning now to FIG. 4, module 302 draws a fluctuating current $I_C$ from power distribution network 305 entirely through a sensing circuit 310. Sensing circuit 310 is to sense current consumption $I_C$ and to output a fluctuating voltage $V_C$ corresponding to $I_C$. A dedicated concealing circuit 315 conceals the current consumption of module 302. Dedicated concealing circuit 315 receives voltage $V_C$ as input. Concealing circuit 315 comprises a controllable current source 312, a dissipative load 314 to draw current from controllable current source 312, and a control circuit 316 to control controllable current source 312. Control circuit 316 receives voltage $V_C$ as input. Controllable current source 312 receives power from one or more power lines, for example, from single voltage source $V_{DD}$, although this is not illustrated explicitly in FIG. 4. A non-exhaustive list of examples for controllable current source 312 includes voltage-to-current converters, operational transconductance amplifiers, and voltage controlled current sources.

Sensing circuit 310 is an example of any one of the sensing circuits illustrated in FIG. 1, FIG. 2-1 and FIG. 2-3. Dedicated concealing circuit 315 comprising controllable current source 312, dissipative load 314 and control circuit 316 is an example of any one of the dedicated concealing circuits illustrated in FIG. 1, FIG. 2-1 and FIG. 2-2.

In the example illustrated in FIG. 4, control circuit 316 comprises differential circuitry 317 and a square root circuit 319. Differential circuitry 317 receives voltage $V_C$ and a reference voltage $V_R$ as inputs and outputs a voltage $V_D$ that is substantially equal to a voltage difference $(\alpha V_R - V_C)$ between a scaled-up version of reference voltage $V_R$ and voltage $V_C$. The scaled-up version of reference voltage $V_R$ is scaled to approximately the scale of voltage $V_C$. If the scale of reference voltage $V_R$ is already approximately the scale of voltage $V_C$, then scaling factor $\alpha$ equals or is close to the value one. Square root circuit 319 receives $V_D$ as input and outputs a voltage $V_S$ that is substantially equal to the square root of $V_D$.

Controllable current source 312 receives $V_S$ as an input and induces a current $I_L$ that is proportional to $\sqrt{\alpha V_R - V_C}$ through dissipative load 314. Thus dissipative load 314 dissipates power that that is proportional to $|\alpha V_R - V_C|$.

Figure 6:
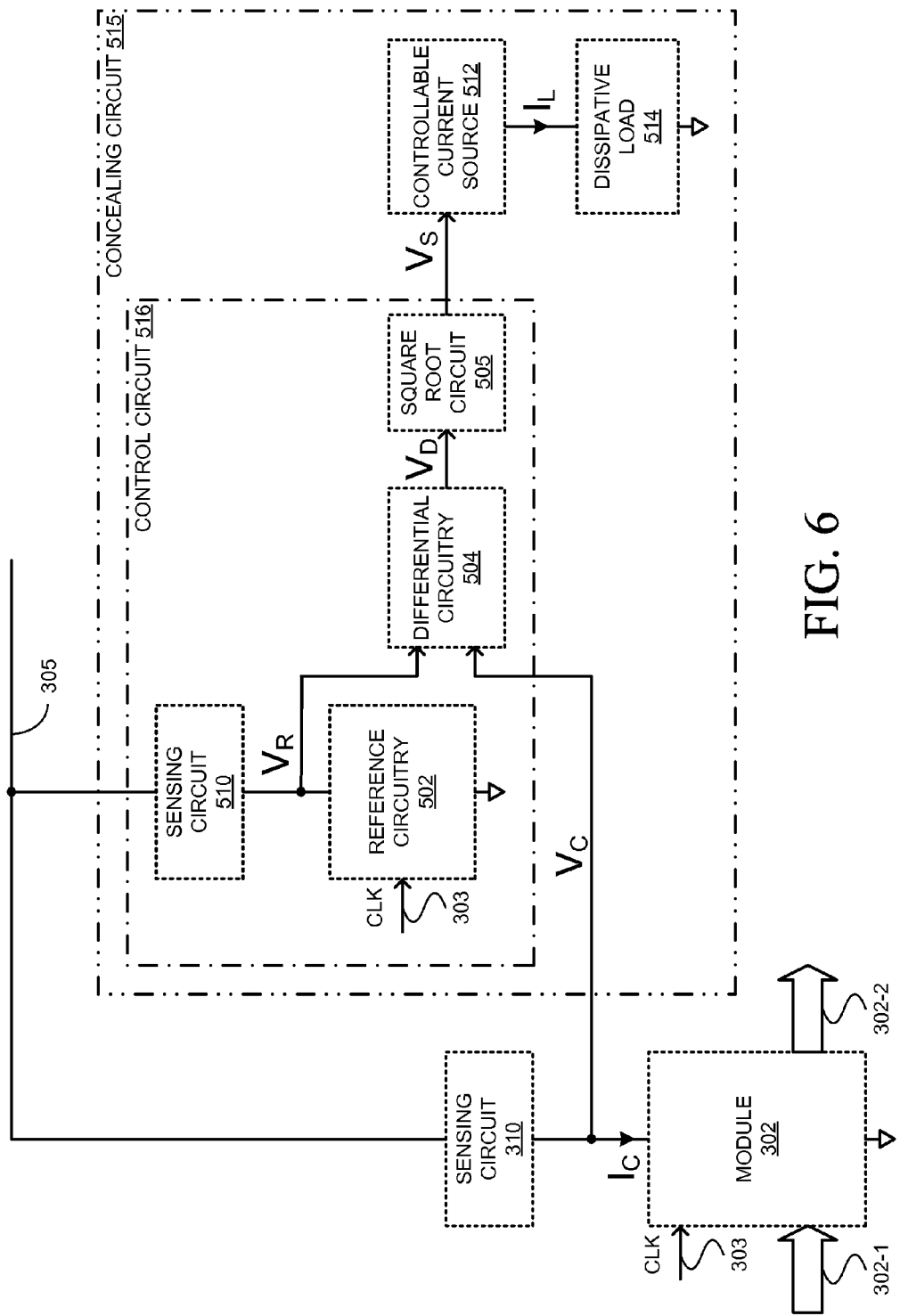
FIG. 6 is a block diagram illustration of a portion of another example integrated circuit, providing additional detail as to the composition of another example concealing circuit.
Figure 7:
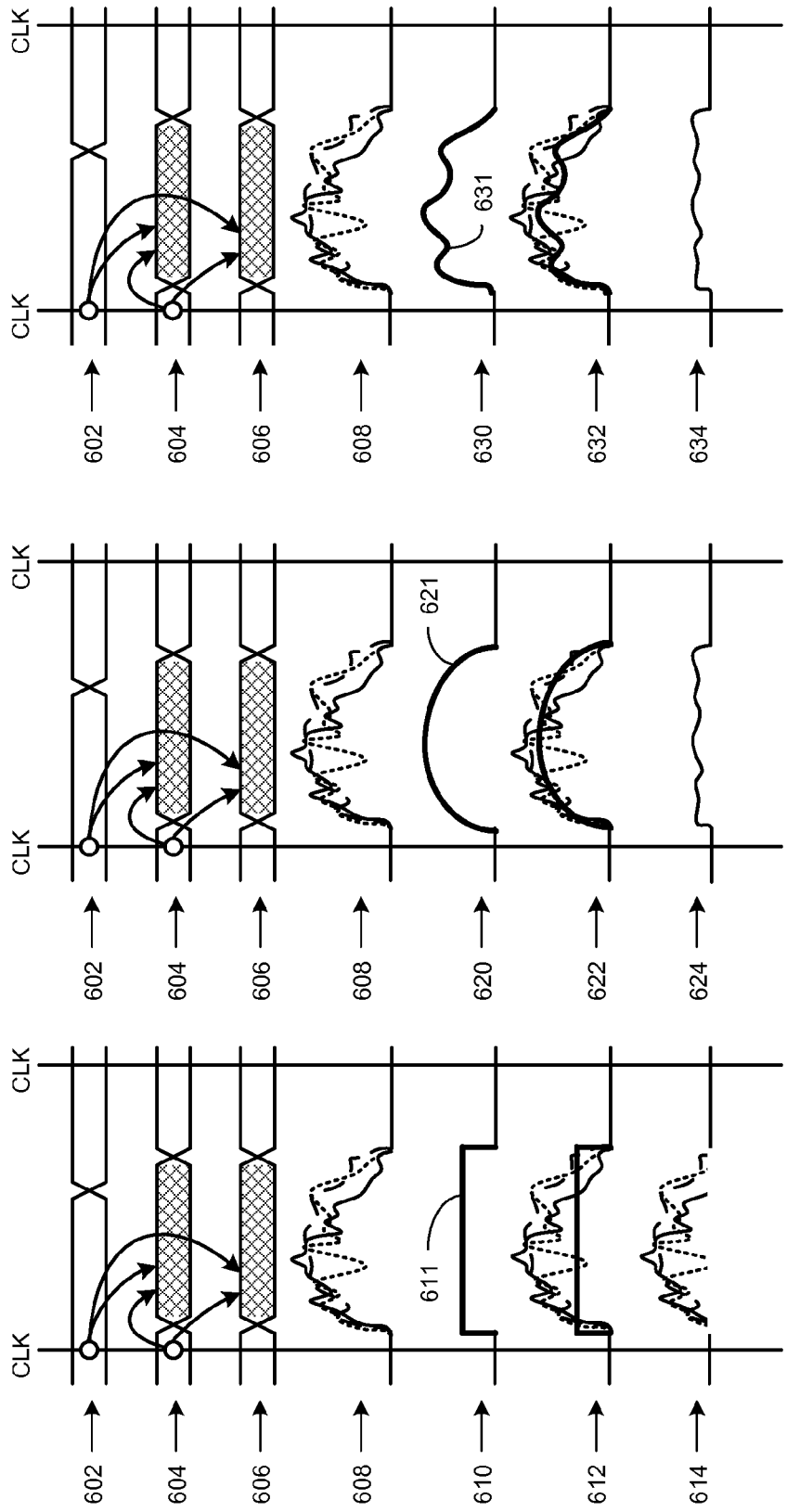
FIG. 7 is another set of example timing diagrams, helpful in understanding the operation of the example concealing circuit of FIG. 6.

FIG. 6 is a block diagram illustration of a portion of another example integrated circuit, providing additional detail as to the composition of another example concealing circuit, and specifically to the composition of another example control circuit. Module 302 is as described above with respect to FIG. 4 and FIG. 5. Sensing circuit 310 is as described above with respect to FIG. 4.

In the example illustrated in FIG. 6, a dedicated concealing circuit 515 conceals the current consumption $I_C$ of module 302. Dedicated concealing circuit 515 receives as input a voltage $V_C$ corresponding to the current consumption $I_C$ sensed by sensing circuit 310. Concealing circuit 515 comprises a controllable current source 512, a dissipative load 514 to draw current from controllable current source 512, and a control circuit 516 to control controllable current source 512. Control circuit 516 receives voltage $V_C$ as input. Controllable current source 512 receives power from one or more power lines, for example, from single voltage source $V_{DD}$, although this is not illustrated explicitly in FIG. 6. A non-exhaustive list of examples for controllable current source 512 includes voltage-to-current converters, operational transconductance amplifiers, and voltage controlled current sources. Dedicated concealing circuit 515 comprising controllable current source 512, dissipative load 514 and control circuit 516 is an example of any one of the dedicated concealing circuits illustrated in FIG. 1, FIG. 2-1 and FIG. 2-2.

In the example illustrated in FIG. 6, control circuit 516 comprises a reference sensing circuit 510, reference circuitry 502, differential circuitry 504 and a square root circuit 505. The operation of one or more logic elements in reference circuitry 502 is synchronized to clock 303. Although reference circuitry 502 comprises logic elements, it is the analog behavior of reference circuitry that is of interest, rather than any digital behavior. Reference circuitry 502 draws current from power distribution network 305 entirely through reference sensing circuit 510. Reference sensing circuit 510 is to sense current consumption of reference circuitry 502 and to output a fluctuating voltage $V_R$ that is proportional to instantaneous current $I_R$. Reference sensing circuit 510, in converting current to voltage, may optionally scale up, so that the scale of voltage $V_R$ is approximately the scale of voltage $V_C$.

Differential circuitry 504 receives voltage $V_C$ and voltage $V_R$ as inputs and outputs a voltage $V_D$ that is substantially equal to a voltage difference $(\alpha V_R - V_C)$ between a scaled-up version of reference voltage $V_R$ and voltage $V_C$. The scaled-up version of reference voltage $V_R$ is scaled to approximately the scale of voltage $V_C$. If the scale of reference voltage $V_R$ is already approximately the scale of voltage $V_C$, then scaling factor $\alpha$ equals or is close to the value one. Square root circuit 505 receives $V_D$ as input and outputs a voltage $V_S$ that is substantially equal to the square root of $V_D$. Controllable current source 512 receives $V_S$ as an input and induces a current $I_L$ that is proportional to $\sqrt{\alpha V_R - V_C}$ through dissipative load 514. Thus dissipative load 314 dissipates power that that is proportional to $|\alpha V_R - V_C|$.

FIGS. 7-1, 7-2 and 7-3 are timing diagrams helpful in understanding the operation of concealing circuit 515. Active edges of clock 303 are illustrated in FIGS. 7-1, 7-2 and 7-3 as vertical lines. The active edges may be the rising edges of clock 303, or the falling edges of clock 303, or both the rising edges of clock 303 and the falling edges of clock 303.

Diagrams 602 illustrate the timing of the one or more data inputs to module 302. The timing of the internal state of module 302 is illustrated in diagrams 604, and the timing of the one or more data outputs of module 302 is illustrated in diagrams 606.

As explained above with respect to FIG. 5, the values of the one or more data inputs may change in advance of each active edge of clock 303, and module 302 samples the data inputs at the active edge. A short time thereafter, the elements of module 302 react to the sampled inputs, eventually settling into a new internal state in advance of the next active edge, and the one or more data outputs settle into new values in advance of the next active edge.

Multiple clock periods are illustrated in each of FIGS. 7-1, 7-2 and 7-3. Diagrams 608 show a superposition of traces 422, 424 and 426, which represent the voltage corresponding to the current consumption of module 302 following active edges 402, 404 and 406, respectively. In other words, diagrams 608 illustrate the voltage $V_C$ output by sensing circuit 310, for the clock periods between active edges 402 and 404, between active edges 404 and 406, and between active edges 406 and 408.

Diagrams 610, 620 and 630 illustrate the scaled-up voltage $\alpha V_R$ for the clock periods between active edges 402 and 404, between active edges 404 and 406, and between active edges 406 and 408.

Diagrams 612, 622 and 632 provide a superposition of voltage $V_C$ and scaled-up voltage $\alpha V_R$. Diagrams 614, 624 and 634 illustrate the difference between the scaled-up voltage $\alpha V_R$ and the voltage $V_C$, and therefore illustrate the output of differential circuitry 504. It is the output of differential circuitry 504 that controls how much current is drawn by controllable current source 512 and dissipated by dissipative load 314. The energy represented by diagrams 614, 624 and 634 is lower than the energy represented by diagrams 608, and therefore the current that controllable current source 512 is controlled to produce is of lower energy than that consumed by module 302.

Reference circuitry 502 may be designed to draw current from power distribution network 305 according to a reference current waveform, thus causing reference sensing circuit 510 to produce a particular reference voltage waveform. For example, as illustrated in diagram 610, a square reference voltage waveform 611 is at its higher level during the time that the elements of module 302 are reacting to newly sampled data inputs and at its lower level during the rest of the time between active edges of clock 303.

In another example, illustrated in diagram 620, a smoother reference voltage waveform 621 that better approximates traces 422, 424 and 426 is used.

As an alternative to designing reference circuitry 502 to cause reference sensing circuit 510 to produce a particular reference voltage waveform, reference circuitry 502 may be any circuitry including logic elements that are synchronized to clock 303. Because reference circuitry 502 includes logic elements that are synchronized to clock 303, its logic elements react to sampled inputs and settle into a new internal state in much the same way as the elements of module 302. Trace 631 illustrated in diagram 630 shows the voltage output by reference sensing circuit 510 in this alternative, which may vary from one time period between active edges of clock 303 to another. For example, reference circuitry 502 may comprise a simple inverter. Reference circuitry 502 may draw much less current than module 302. The sampled current waveform of reference circuitry 502 may be amplified by reference sensing circuit 510 to generally have a similar magnitude as that of the current consumption of module 302.

Figure 8:
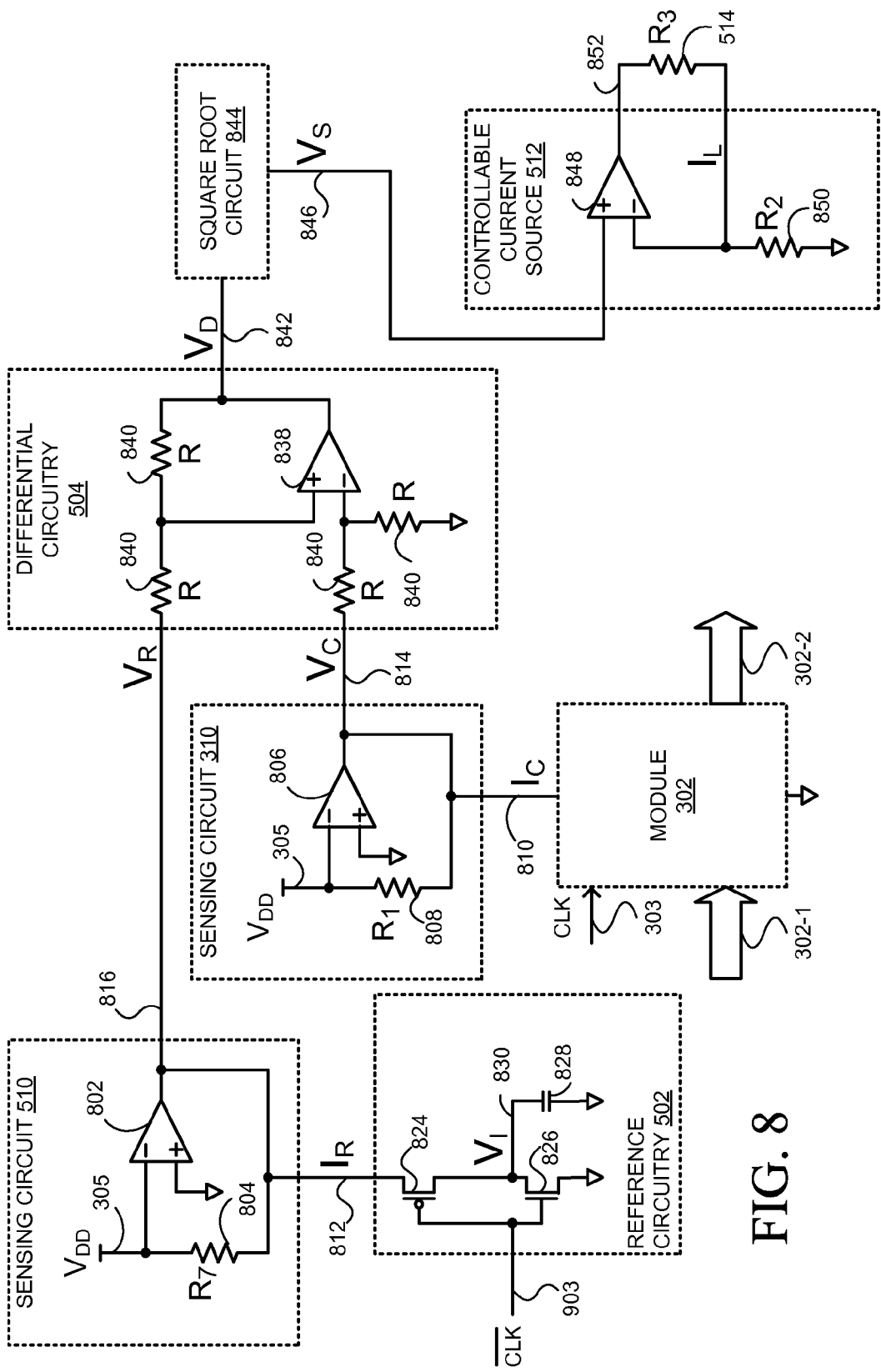
FIG. 8 is a circuit diagram illustration of an example portion as in FIG. 6.
Figure 9:
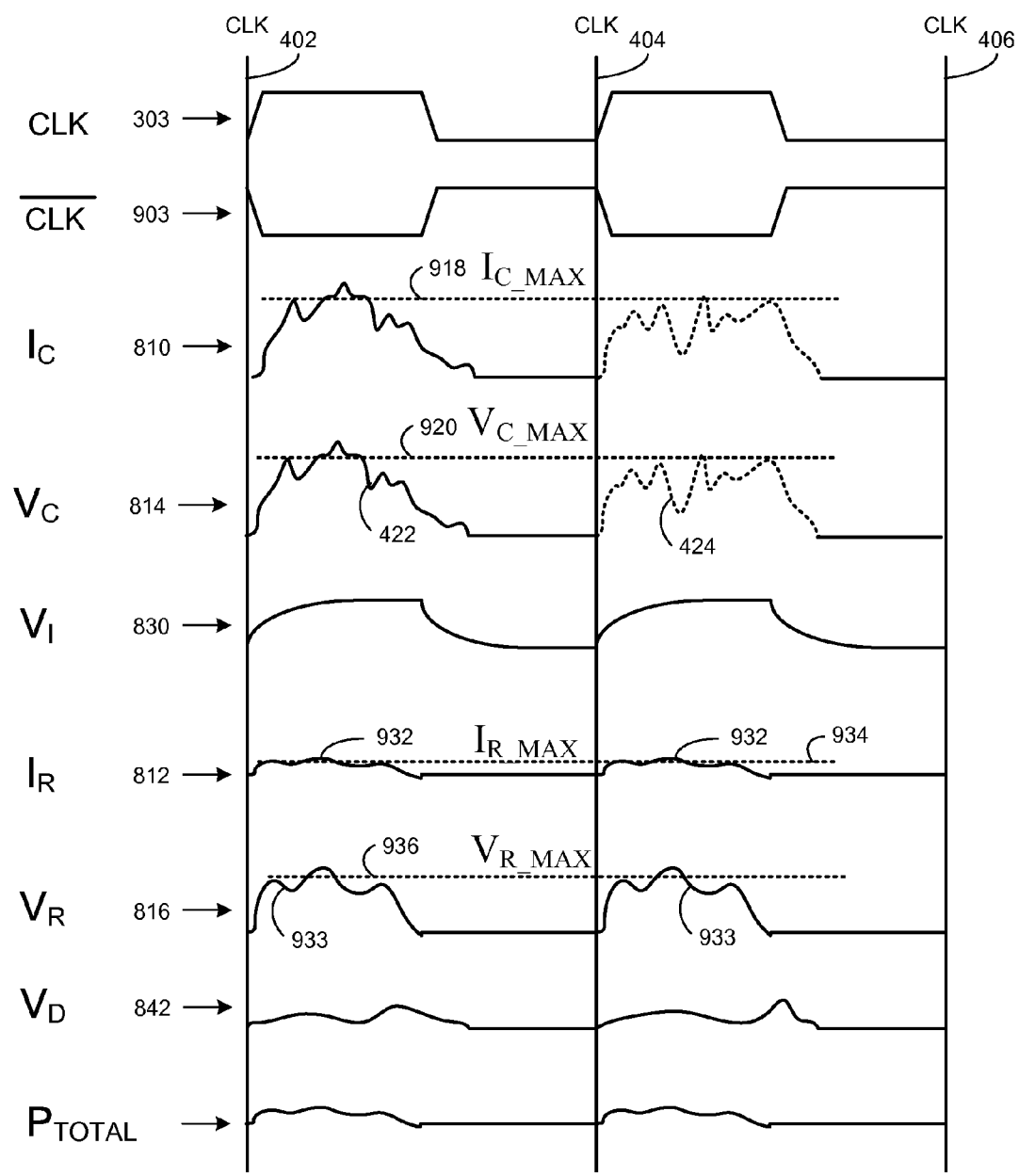
FIG. 9 is a set of example timing diagrams, helpful in understanding the operation of the example concealing circuit of FIG. 8.

FIG. 8 is a circuit diagram illustration of an example implementation of the integrated circuit portion of FIG. 5. FIG. 9 is a timing diagram helpful in understanding the operation of the circuit diagram of FIG. 8. For clarity, the circuit diagram of FIG. 8, the timing diagram of FIG. 9 and the corresponding description are simplified. For further clarity, some reference numerals in FIGS. 8 and 9 are the same as in FIG. 5. However, some reference numerals are different or added in FIGS. 8 and 9 to emphasize the exemplary implementation. The usage of reference numerals is not intended to be limiting.

In FIG. 8, reference sensing circuit 510 includes an OP_AMP 802 and a resistor 804, further referenced $R_7$, connected in a current-to-voltage conversion configuration. Similarly, sensing circuit 310 includes an OP_AMP 806 and a resistor 808, further referenced $R_1$, connected in a current-to-voltage conversion configuration. Module 302 consumes a fluctuating current 810, further referenced $I_C$. Reference circuitry 502 consumes a fluctuating current 812, further referenced $I_R$. Sensing circuit 310 outputs a fluctuating voltage 814, further referenced $V_C$. Reference sensing circuit 510 outputs a fluctuating voltage 816, further referenced $V_R$. Reference sensing circuit 510, in converting current to voltage, may optionally scale up by appropriate choice of $R_7$, so that the scale of voltage $V_R$ is approximately the scale of voltage $V_C$.

In general, the relationship between $I_C$ and $V_C$ is as shown in equation (1), and the relationship between $I_R$ and $V_R$ is as shown in equation (2).

$$V_C = I_C * R_1 \quad (1)$$

$$V_R = I_R * R_7 \quad (2)$$

In the example of FIGS. 8 and 9, module 302 is driven by clock 303 and the active edges of clock 303 are the rising edges (from a low logic level to a high logic level). Accordingly, current consumption traces such as 422 and 424 (discussed in relation to FIG. 4) appear in FIG. 9 following the rising edges of clock signal 303.

In FIG. 9, horizontal dotted line 918 represents a selectable maximal value of $I_C$, further referenced $I_{C\_MAX}$. Each of the current consumption traces of $I_C$ may have several current spikes and $I_{C\_MAX}$ may be selected to be higher than all the current spikes or to be higher than some of the current spikes and lower than others of the current spikes.

In FIG. 9, horizontal dotted line 920 represents a maximal value $V_{C\_MAX}$ of $V_C$, corresponding to $I_{C\_MAX}$. In general, the relationship between $I_{C\_MAX}$ and $V_{C\_MAX}$ is as shown in equation (3).

$$V_{C\_MAX} = I_{C\_MAX} * R_1 \quad (3)$$

In the example of FIGS. 8 and 9, and in contrast to FIG. 5, reference circuitry 502 receives an inverse clock signal 903 and not clock signal 303. As shown in FIG. 9, inverse clock signal 903 has logic levels that are opposite to the logic levels of clock signal 303.

In the example of FIGS. 8 and 9, reference circuitry 502 is an inverter circuit, made of transistors 824 and 826. Inverter circuit 502 has an output capacitance 828 which may be influenced by properties of transistors 824 and 826. Following falling edges (e.g. 402, 404 and 406 in FIG. 9) of inverse clock signal 903, transistor 824 directs current 812, further referenced $I_R$, to charge output capacitance 828. Following rising edges of inverse clock signal 903, transistor 826 discharges output capacitance 828 into the electrical ground. As a result, a fluctuating voltage 830, further referenced $V_I$, develops over output capacitance 828. As shown in FIG. 9, current $I_R$ is consumed by inverter 502 primarily while output capacitance 828 is being charged via transistor 824. Therefore, fluctuations 932 in current $I_R$ occur following active edges 402, 404 and 406 of clock 303. The duration of fluctuations 932 in $I_R$ and hence of fluctuations 933 in $V_R$ depend on output capacitance 828. With an appropriate choice of output capacitance 828, the fluctuations 932 in $I_R$ and hence the fluctuations 933 in $V_R$ will occur substantially at the same times as the fluctuations in the current $I_C$. In other words, with an appropriate choice of output capacitance 828, reference circuitry 502 and module 302 have approximately the same duty cycle of activity and inactivity.

In FIG. 9, horizontal dotted line 934 represents a selectable maximal value of $I_R$, further referenced $I_{R\_MAX}$. Each of the current consumption traces of $I_R$, such as 932, may have several current spikes and $I_{R\_MAX}$ may be selected to be higher than all the current spikes or to be higher than some of the current spikes and lower than others of the current spikes. Horizontal dotted line 936 represents a maximal value $V_{R\_MAX}$ of $V_R$, corresponding to $I_{R\_MAX}$. In general, the relationship between $I_{R\_MAX}$ and $V_{R\_MAX}$ is as shown in equation (4).

$$V_{R\_MAX} = I_{R\_MAX} * R_7 \quad (4)$$

While reference circuit 502 includes only one logic gate (an inverter) in the example of FIG. 8, module 302 may contain many logic elements. As a result, $I_{R\_MAX}$ may be much smaller than $I_{C\_MAX}$. However, $R_7$ may be selected such that $V_{R\_MAX}$ substantially equals $V_{C\_MAX}$. Equation (5) shows the selection criteria for $R_1$ and $R_7$ according to the relationship between $V_{C\_MAX}$ and $V_{R\_MAX}$.

$$I_{C\_MAX} * R_1 = I_{R\_MAX} * R_7 \quad (5)$$

In the illustrated example, differential circuitry 504 receives $V_C$ and $V_R$ as inputs and includes an OP-AMP 838 and four resistors 840. Resistors 840 are selected to have substantially the same resistance, referenced R, and are connected with OP-AMP 838 in a differential amplifier configuration. Differential circuitry 504 outputs a fluctuating voltage 842, further referenced $V_D$. In general, the relationship between difference voltage $V_D$, reference voltage $V_R$, and voltage $V_C$ is as shown in equation (6).

$$V_D = \alpha V_R - V_C = \alpha I_R R_T - I_C R_1 \quad (6)$$

$\alpha V_R$ is a scaled-up version of reference voltage $V_R$. If the scale of reference voltage $V_R$ is already approximately the scale of voltage $V_C$, then scaling factor $\alpha$ equals or is close to the value one.

Difference voltage $V_D$ is of much lower energy than voltage $V_C$, because reference voltage $V_R$ is of similar magnitude to the portion of voltage $V_C$ that is due to the general switching of module 302. The portion of voltage $V_C$ that is due to the data-specific switching of module 302 is generally of much smaller magnitude than $V_{C\_MAX}$. Thus controllable current source 512 and dissipative load 514 handle a much lower energy than $V_{C\_MAX}$.

Manipulation of equations (1) to (6) demonstrate that $$V_D = R_1 \left( \alpha I_R * \frac{I_{C\_MAX}}{I_{R\_MAX}} - I_C \right) \quad (7)$$

In the illustrated example, a square root circuit 844 receives $V_D$ as an input and outputs a fluctuating voltage 846, further referenced $V_S$. In general, the relationship between $V_S$ and $V_D$ is as shown in equation (8).

$$V_S = \sqrt{V_D} = \sqrt{R_1 * \left( \alpha I_R \frac{I_{C\_MAX}}{I_{R\_MAX}} - I_C \right)} \quad (8)$$

In the illustrated example, controllable current source 512 receives $V_S$ as an input and includes an OP-AMP 848 and a resistor 850, further referenced $R_2$. OP-AMP 848, resistor 850 and dissipative load 514, further referenced $R_3$, are connected in a voltage-to-current conversion configuration. A fluctuating current 852 flows through $R_3$ and is further referenced as $I_L$. In general, the relationships between $V_D$, $V_S$ and $I_L$ are as shown in equation (9), and the power $P_L$ dissipated at $R_3$ is shown in equations (10) and (11).

$$I_L = \frac{V_S}{R_2} = \frac{\sqrt{V_D}}{R_2} \quad (9)$$

$$P_L = (I_L)^2 R_3 = V_D \frac{R_3}{(R_2)^2} \quad (10)$$

$$P_L = \frac{R_1 R_3}{(R_2)^2} \left( \alpha I_R \frac{I_{C\_MAX}}{I_{R\_MAX}} - I_C \right) \quad (11)$$

The power $P_L$ dissipated by the dissipative load 514 includes a portion, $$\frac{R_1 R_3}{(R_2)^2} \alpha I_R,$$

that is proportional to the voltage $V_R$.

In general, the power $P_C$ dissipated at module 302 is approximated in equation (12) and the total power dissipated by module 302 and $R_3$ together, termed 'the instantaneous power sum $P_{TOTAL}$', is shown in equation (13).

$$P_C = I_C V_{DD} \quad (12)$$

$$P_{TOTAL} = P_L + P_C = \frac{R_1 R_3}{(R_2)^2} \left( \alpha I_R \frac{I_{C\_MAX}}{I_{R\_MAX}} - I_C \right) + I_C V_{DD} \quad (13)$$

One way to conceal the power consumption $P_C$ of module 302 is for the instantaneous power sum $P_{TOTAL}$ to be substantially independent of fluctuations in the current $I_C$ consumed by module 302. The resistances of $R_1$, $R_2$ and $R_3$ may be chosen to satisfy equation (14).

$$\frac{R_1 R_3}{(R_2)^2} = V_{DD} \quad (14)$$

Consequently, as shown in equation (15), the total power consumption $P_{TOTAL}$ becomes substantially dependent on the waveform of $V_R$, substantially independent of the waveform of $V_C$ and substantially independent of the power consumption of module 302.

$$P_{TOTAL} = P_C + P_L = \alpha I_R \frac{I_{C\_MAX}}{I_{R\_MAX}} \frac{R_1 R_3}{(R_2)^2} \quad (15)$$

In the examples of FIGS. 7-1, 7-2 and 7-3, $P_{TOTAL}$ may substantially follow curves 611, 621 or 631, and may have much less correlation to the curves of line 608.

In another implementation of the circuit of FIG. 8, reference circuitry 502 and reference sensing circuit 510 may be omitted and reference voltage $V_R$ may be set to a constant value.

In yet another implementation of the circuit of FIG. 8, reference circuitry 502 may be circuitry that generates a desired reference voltage waveform.

Figure 10:
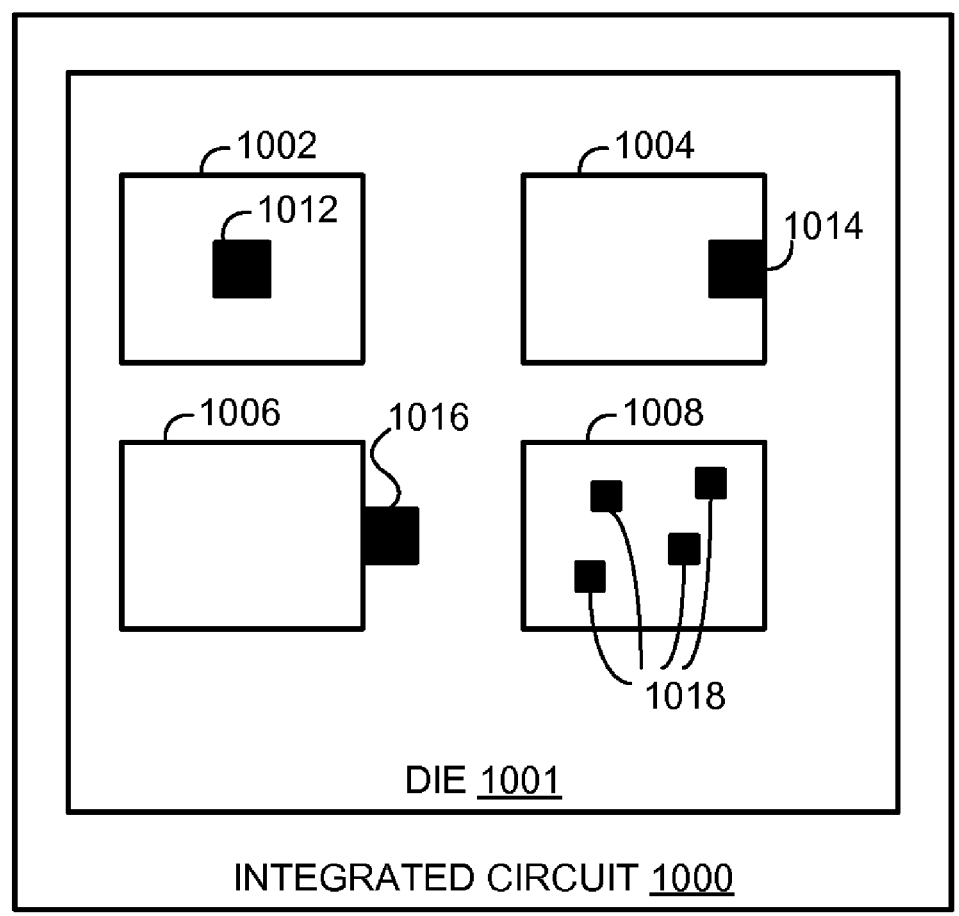
FIG. 10 is a block diagram illustration of a portion of an example integrated circuit, including modules of logic circuitry and corresponding dissipative loads.

FIG. 10 is a block diagram illustration of a portion of an example integrated circuit 1000, illustrating different options for the placement of dissipative loads relative to logic modules. Integrated circuit 1000 comprises a semiconductor die 1001 and, if the integrated circuit is a packaged die, packaging (not shown) for semiconductor die 1001. Semiconductor die 1001 comprises logic modules 1002, 1004, 1006, and 1008, each located in a different area of semiconductor die 1002. Logic modules 1002, 1004, 1006, and 1008 represent any of the logic modules discussed above with respect to FIGS. 1-9.

Dissipative loads 1012, 1014, 1016, and 1018, corresponding to logic modules 1002, 1004, 1006, and 1008, respectively, are located on die 1001. Placement of a dissipative load may be selected, for example, to interfere with or thwart electromagnetic (EM) probe attacks.

For example, dissipative load 1012 is placed at substantially the middle of the area occupied by logic module 1002. In another example, dissipative load 1014 is placed inside and close to an edge of the area occupied by logic module 1004. In a further example, dissipative load 1016 is placed outside and close to an edge of the area occupied by logic module 1006. In yet another example, dissipative load 1018, which is a distributed load and, as an example, is shown to have four portions, is placed inside the area occupied by logic module 1008. Each portion of dissipative load 1018 is operable to dissipate a portion of the power to be dissipated by dissipative load 1018 as a whole.

Dissipative loads, as in the examples illustrated in FIG. 10, may be placed or distributed to accommodate different concerns. A placement may be selected, for example, to accommodate placement and routing constraints of the semiconductor die, or to improve or optimize protection from EM probe attacks, or both. In one example, if a logic module emits EM emission substantially evenly throughout its area, a distributed dissipative load may be suitable to better thwart an EM probe attack. In another example, EM emission may be higher at particular areas of the logic module, and dissipative loads may be placed near these particular areas.

Although the subject matter has been described in language specific to structural features, methodological acts or both, it is to be understood that the subject matter defined in the appended claims is not necessarily limited to the specific features or acts described above. Rather, the specific features and acts described above are disclosed as example forms of implementing the claims.

What is claimed is:

1. An integrated circuit comprising:
   logic circuitry for performing one or more operations, the logic circuitry driven by a clock;
   a first sensing circuit operable to output a voltage $V_C$ that is proportional to an instantaneous current consumption $I_C$ of the logic circuitry;
   reference circuitry having one or more logic elements, wherein operation of the logic elements is synchronized to the clock;
   a second sensing circuit operable to output a voltage $V_R$ that is proportional to an instantaneous fluctuating current consumption $I_R$ of the reference circuitry;
   differential circuitry operable to output a voltage difference $\alpha V_R - V_C$ between a scaled-up version $\alpha V_R$ of the voltage $V_R$ and the voltage $V_C$, the scaled-up version $\alpha V_R$ scaled to approximately the scale of the voltage $V_C$;
   a square root circuit operable to receive the voltage difference as input and operable to output a square root of the voltage difference;
   a dissipative load operable to dissipate an instantaneous power $P_L$; and
   a controllable current source controllable by the output of the square root circuit for generating current through the dissipative load.

2. The integrated circuit as recited in claim 1, wherein the logic elements comprise an inverter.

3. The integrated circuit as recited in claim 1, wherein the differential circuitry comprises a differential amplifier.

4. The integrated circuit as recited in claim 1, wherein the controllable current source comprises a voltage-to-current converter.

5. The integrated circuit as recited in claim 1, wherein the logic circuitry performs one or more cryptographic operations.

6. The integrated circuit as recited in claim 1, wherein the logic circuitry and the reference circuitry have approximately the same duty cycle of activity and inactivity.

7. The integrated circuit as recited in claim 1, wherein the instantaneous power $P_L$ includes a portion that is proportional to the voltage $V_R$, and the instantaneous power $P_L$ is less than the portion that is proportional to the voltage $V_R$ by an amount substantially equivalent to the instantaneous power $P_C$ to be dissipated by its respective one of the modules, whereby an instantaneous power sum $P_{TOTAL}$ of the instantaneous power $P_L$ and the instantaneous power $P_C$ is substantially proportional to the voltage $V_R$.

* * * * *